United States Patent Office 3,364,192
Patented Jan. 16, 1968

3,364,192
ANTISTATIC POLYMER COMPOSITIONS CONTAINING AMMONIUM PHOSPHATES
James M. Leach, Greensboro, N.C., assignor to Chas. Pfizer & Co., Inc., New York, N.Y., a corporation of Delaware
No Drawing. Continuation-in-part of application Ser. No. 304,947, Aug. 27, 1963. This application July 27, 1964, Ser. No. 385,269
19 Claims. (Cl. 260—94.9)

ABSTRACT OF THE DISCLOSURE

Cationic organic electrolytes which are tertiary amine salts of phosphoric and dithiophosphoric acid esters and their utility as anti-static agents for polymeric resins.

---

This application is a continuation-in-part of application Ser. No. 304,947 as filed Aug. 27, 1963, and now abandoned.

This invention is concerned with antistatic agents, and more particularly with novel ammonium phosphates, compositions containing them, and their use in suppressing the accumulation of static electrical charges.

As is well known, static charges tend to accumulate on non-metallic surfaces subjected to friction. Because of their low electrical conductivity, textiles and resins can in this manner acquire charges of great intensity which constitute a handling problem and a serious safety hazard as well as a personal nuisance. Polyethylene, polypropylene, polystyrene, polyamides, acrylics and vinyls are among the many substances subject to this problem.

Accordingly, there is a great and continuing demand for destaticizers or antistatic agents, which has been met in the past by a variety of substances, each characterized by one or more significant disadvantages. In particular, owing to limited solubility in the resin and/or limited heat stability at processing temperatures, it has generally been necessary to apply these agents to the surface of the finished product, as by wiping, soaking or spraying alone or as a solution in water or a volatile solvent. This is a serious drawback, since the antistatic effect afforded is of necessarily limited duration as the agent is lost by vaporization or adherence to other objects with which the treated surface comes in contact.

A novel group of cationic organic electrolytes have now been discovered which are not subject to these disadvantages. They are tertiary amine salts of phosphoric and dithiophosphoric acid esters, having the formula

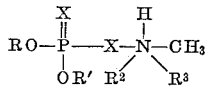

wherein R is selected from the group consisting of hydrogen, alkyl of up to 18 carbon atoms, monoalkylphenyl of from 4 to 12 carbon atoms in the alkyl group, and substituents of the formula

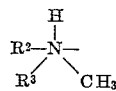

R' is selected from the group consisting of alkyl of up to 18 carbon atoms and monoalkyl phenyl of from 4 to 12 carbon atoms in the alkyl group,
$R^2$ is alkyl of up to 18 carbon atoms,
$R^3$ is alkyl of from 12 to 18 carbon atoms, and
X is selected from the group consisting of oxygen and sulfur.

These unique substances possess a number of remarkable advantages, chief among them being outstanding compatability and stability. The chain length of the various substituents regulates the solubility behavior to a large extent. Depending upon the particular application and processing conditions, appropriate members of the class may be selected to provide the optimum polarity, compatibility and vapor pressure characteristics. Particularly preferred for their low cost and high effectiveness are those in which X is oxygen, e.g. those wherein $R^2$ is methyl and $R^3$ is octadecyl.

For example, in the case of polyethylene, it has been found that excellent resin solubility is exhibited by such substances as octadecyl dimethyl ammonium di(tridecyl) phosphate

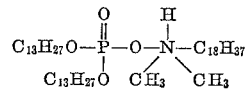

as well as by octadecyl dimethyl ammonium hydrogen tridecyl phosphate

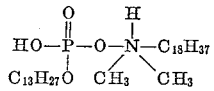

and by bis(octadecyl dimethyl ammonium) tridecyl phosphate

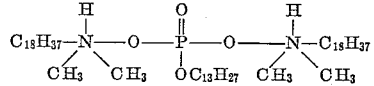

and by mixtures of these substances. They can be combined directly with the polyethylene prior to extrusion or molding, permitting an ease of incorporation not heretofore possible. These products are in general colorless liquids or, in the case of the lower alkyl esters, low-melting solids, which readily survive processing temperatures to provide permanent antistatic protection. They are stable for substantial periods of time even at temperatures of 350–425° F. and higher, and compositions containing them exhibit a resistance to thermal darkening equal to, and in some instances superior to, that of the resin itself. In addition, their wide compatibility is shown by the variety of solvents with which they are miscible, including hexane, benzene, acetone, methanol, ethanol, isopropanol, octanol, dioctyl phthalate and dioctyl azelate. Comparable advantages in other resins are realized by selecting other members of the new class of substances. Thus, as will be apparent to those skilled in the art, the products having the higher alkyl substituents will generally be favored for the less polar hydrocarbon resins, and the lower for the more polar products.

The new products are readily prepared by combining mono- and dialkyl phosphates or dithiophosphates with the calculated proportion of teriary amine, and heating, e.g. to 50° C. The necessary phosphate esters may be prepared by the reaction of phosphorus pentoxide or pentasulfide with the appropriate alcohol, alcohol mixture, or alkylphenol, for example by heating at 100° C. until titration shows the reaction to be substantially complete. If desired, the esters may be further purified, e.g. by countercurrent solvent extraction or by chromatography on alumina or anion exchange resins, before reaction with the amine, but this is ordinarily unnecessary. Other standard methods for the preparation of phosphates may be also employed, including the reaction of phosphorus oxychloride with alcohol, which is facilitated by sweeping the reaction mixture with a current of air to drive off the byproduct hydrogen chloride, or by the addition of pyridine or other base to neutralize the hydrogen chloride. The reaction occurs in stepwise fashion and lends itself to the preparation of mixed esters of different alcohols. It is best conducted, initially at least, at room temperature or below, and is followed by hydrolysis to form the desired partial ester.

If desired, the antistatic agents of the present invention may be combined with the product to be treated by the conventional methods previously mentioned, i.e. by spraying, dipping, wiping or soaking, either alone, in volatile solvent, or in polish compositions, or they may be employed as mold lubricants alone or in combination with conventional lubricants. However, in the case of plastics and resins it will often be preferred to homogenize them throughout the resin to insure permanent antistatic properties. Thus, they may be blended directly with the polymer before molding, milling, spinning or extrusion, or, where a plasticizer is employed, they may be dissolved therein to insure uniform distribution in the final product. In some cases it may be desirable to disperse them in the monomer prior to polymerization.

In polyolefins, e.g. polyethylene and polypropylene, the new agents are also useful for enhancing printability or printing ink acceptance, which otherwise tend to be poor with conventional anionic printing inks. In this application it is desirable to incorporate the agent directly within the resin.

In a further embodiment of the present invention, polyolefin articles formed by blow-molding are rendered antistatic by introducing the agent into the compressed air supply to the mold. This results in the deposition of a film of agent on the inside surface of the bottle or other molded article, which is found to reduce static charge accumulation even on the outer surfaces of the article.

A wide range of concentrations of these agents may be employed in the applications described, but levels of from about 0.01 to 6–10% by weight, and preferably from 0.05 to 2% will generally be most appropriate. Levels below 0.01% also provide antistatic properties, but usually to a lesser degree, and no added advantage is ordinarily experienced at levels substantially beyond 10%.

A variety of known methods may be used to evaluate the treated products. Perhaps the simplest test involves rubbing the surface with a clean woolen cloth in an effort to induce a static charge and then determining whether tobacco ash is attracted to the object. More precise tests employ a static meter having a probe with which the surface can be explored to detect static charges in terms of an induced voltage reading, and to determine how rapidly such charges are dissipated. Instruments such as the Herbert Statitector or the Baldwin-Dunlop Statigun provide useful comparative data when employed under consistent conditions of temperature and relative humidity. In such tests the products containing the antistatic agents of the present invention exhibit substantially reduced tendency to accumulate a static charge in comparison with the untreated controls. The data demonstrate the formation of a lower static charge, which dissipates promptly, while the plastic containing no antistatic agent retains a significant charge for substantial periods of time.

The new substances are useful in a great variety of plastics, resins and surface coatings including polyethylene, polypropylene, polystyrene, polyamides, polyesters, polyvinyl chloride, polyvinylidene chloride, acrylates and methacrylates polyurethanes, phenolics, and acrylonitrile polymers and copolymers, including acrylonitrile-butadiene-styrene copolymers. The treated products are useful in many applications, and particularly in plastic furniture, seat covers, photographic films and plates, machinery drive belts, floor tile, rugs, instrument cases, phonograph records, floor waxes, plastic wrap garments, hospital slip sheets, tablecloths, radio and television cabinets and plastic bottles. These antistatic agents may also be combined with powders which tend to adhere to surfaces, to reduce this tendency.

The following examples are provided solely for illustrative purposes and should not be interpreted as limiting the invention, the scope of which is defined by the appended claims.

*Example 1*

Phosphorus pentoxide, one mole, is combined with 2.95 moles tridecyl alcohol and heated at 100° C. until titration indicates substantially complete reaction (about 3 hours). The product consists of a substantially equimolar mixture of mono- and di-(tridecyl) phosphates.

*Example 2*

The product of Example 1 is combined with three moles of octadecyldimethylamine and heated at 50° C. to form a substantially equimolar mixture of octadecyldimethylammonium di(tridecyl) phosphate and bis(octadecyldimethylammonium) tridecyl phosphate. The product is a light colored liquid. The reaction is judged to be complete when a constant pH is reached, as measured on a 10% solution of a sample in 3:1 ethanol:water.

*Example 3*

The product of Example 1 is combined with two moles of octadecyldimethylamine and heated at 50° C. as in Example 2 to form a substantially equimolar mixture of octadecyldimethylammonium di(tridecyl) phosphate and octadecyldimethylammonium hydrogen tridecyl phosphate. The product is a light colored liquid having a viscosity of 2180 cp. at 25° C., a specific gravity of 0.909 (20/15.5° C.), and a pH in 3:1 ethanol:water of 6.4 (10 g./100 ml.). It is found to be thermally stable at temperatures up to 562° F.

*Example 4*

The products of Examples 2 and 3 are incorporated in low density, film-grade polyethylene (Alathon 2315, available from the Du Pont Company) by addition from a dispensing burette into the resin pellets at the point of introduction to a 4½" vented Sterling extruder operating at 375° F. (residence time about 2½ minutes). The extruded polyethylene is pelletized in a Cumberland pelletizer and the pellets are extruded at 350° F. into 14½" lay-flat 1.5 mil film in a Hartig 2" extruder having a 6" blown tubing die (residence time about 2 minutes).

The product of Example 2 is incorporated at levels of 0.5 and 1.1% by weight, and the product of Example 3 at 0.5 and 0.8% by weight. Electrical resistance of the films (10 layers: 22 mil thickness) is measured with a 20 million megohmmeter (Electronic Instruments Ltd. Model 29U) at 76° F. and 61% relative humidity:

| Agent | Concentration, percent | Resistance, megohms |
|---|---|---|
| None (control) | | 5,000,000 |
| Example 2 product | 1.1 | 80 |
| Example 2 product | 0.5 | 4,000 |
| Example 3 product | 0.8 | 15,000 |
| Example 3 product | 0.5 | 55,000 |

The charge on the treated samples dissipates substantially instantaneously, whereas control specimens retain the charge beyond two minutes.

The film specimens containing the new antistatic agents retain their antistatic properties during a 7-month period of observation.

These polyethylene films are also subjected to printing tests and are found to accept the impression nicely, whereas the untreated control exhibits extensive areas of discontinuity in the printed image. Similar results are achieved at levels of 0.01 to 2%.

*Example 5*

The polyethylene compositions of Example 4 are subjected to heat stability tests at 350° F. for 100 minutes and at 425° F. for 30 minutes, with sample panels being withdrawn at 10 minute intervals. At 350° F. the compositions containing the antistatic agents are substantially equivalent to polyethylene containing no agent, with very slight yellowing observed after 80 minutes. At 425° F. all specimens containing the antistatic agents are superior to the untreated polyethylene controls.

Example 6

The product of Example 2 is applied to the inner surface of polyethylene bottles by introduction into the air stream which is used to blow the bottles. The resin employed is a detergent-grade polyetheylene (Dow R-215) which is blown into one-quart bottles with 60 p.s.i. compressed air in a conventional mold. The bottle remains in the mold for 10 seconds, and the air is then vented to the atmosphere and the bottle ejected. The antistatic agent is sucked into the feed air in the form of a mist from an oil reservoir mounted in the air supply line, depositing 0.03% by weight of the agent on the inside surface of the bottle. The antistatic effect is manifested on the outside, as well as the inside surface. Similar results are obtained at levels of 0.01 to 2%.

Example 7

Dodecyldimethylammonium ethyl phosphate (mixed mono- and diesters) is prepared by the procedures of Examples 1 and 3, with substitution of corresponding molar proportions of ethanol and dodecyldimethylamine for the respective alcohol and amine of Examples 1 and 3. This product is a solid, melting at 76–78° C. and thermally stable up to 470° F. At 80° C. it has a viscosity of 32 cp. and a specific gravity of 0.921. A 10 g./100 ml. solution in 3:1 ethanol:water exhibits a pH of 6.5.

Example 8

The product of Example 7 is incorporated at a concentration of 0.5% in high density, detergent-bottle grade polyethylene (Celanese Fortiflex B50-20R) and the polyethylene is compression-molded to a 6 x 6 x 0.04 inch plaque. A charge applied to the molding by rubbing briskly with a wool cloth (50 strokes) is completely dissipated within 24 seconds, as shown by an electroscope, whereas a charge on a control specimen without the antistatic agent has not dissipated after 26 minutes.

In another experiment, the same antistatic agent is applied with a draw-down blade as a 0.05% solution in ethanol (one ml.) to polyethylene film (Du Pont Alathon 2315; 14½ x 7½ x 0.002 inch). The film is air-dried, wiped with cheese cloth, and charged as before at 24% relative humidity. Five seconds later, no static charge is detectable at 0 inch with the electroscope, whereas the charge on an untreated control still activates the electroscope at 2 inches after 54 hours.

In a further experiment, the same agent is applied in ethanol solution to 1.57 mil polyester film (Du Pont Mylar) by 2 minutes' immersion followed by air-drying. Resistance is then measured with the megohmmeter at 71–72° F. and 66–68% relative humidity:

| Concentration of agent in ethanol solution: | Electrical resistance, megohms |
|---|---|
| Untreated control | 2,000,000 |
| 0.1% | 120 |
| 1% | 8.7 |

Example 9

Octadecyldimethylammonium nonylphenyl phosphate (mixed mono- and diesters) is prepared by following the procedures of Examples 1 and 3 with the substitution of 3 moles of nonylphenol for the tridecyl alcohol of Example 1. The resulting product, at levels of 0.01 to 6%, exhibits antistatic properties in polyethylene very similar to the properties of the product of Example 3. It is also tested in polyvinyl chloride floor tiles, being incorporated directly in the n-octyl, decyl trimellitate plasticizer at a concentration of 0.1% by weight. At this level it reduces the electrical resistance of the plasticizer from 2500 to 49 megohms.

The corresponding butylphenyl, octylphenyl, and dodecylphenyl phosphate salts are prepared from the appropriate alkylphenols in the same way.

Example 10

Di(tridecyl) dithiophosphate is prepared by the reaction of 4 mols of tridecanol with one mol of phosphorous pentasulfide as in Example 1. The acid phosphate is then neutralized with 2 mols of dimethyloctadecylamine, yielding a viscous, light-colored liquid product which is thermally stable up to 567° F. and which exhibits excellent antistatic properties in polymeric resins at levels of 0.01–10%.

The following dithiophosphates are prepared in similar manner:

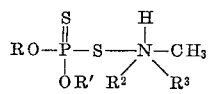

| R | R' | R² | R³ |
|---|---|---|---|
| $CH_3$ | $CH_3$ | $CH_3$ | $C_{18}H_{37}$ |
| $C_4H_9$ | $C_4H_9$ | $C_{12}H_{25}$ | $C_{12}H_{25}$ |
| $C_8H_{17}$ | $C_8H_{17}$ | $CH_3$ | $C_{16}H_{33}$ |
| $C_{18}H_{37}$ | $C_{18}H_{37}$ | $CH_3$ | $C_{12}H_{25}$ |
| $C_8H_{17}C_6H_4$ | $C_8H_{17}C_6H_4$ | $CH_3$ | $C_{12}H_{25}$ |

Example 11

Di(2-ethylhexyl) phosphoric acid is caused to react with an equimolar proportion of each of the following amines as previously described, to prepare a series of antistatic agents of the formula

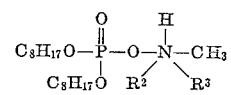

dimethyldodecylamine
dimethyltetradecylamine
dimethyloctadecylamine
methyl di(dodecyl)amine
methyl di(tetradecyl)amine
methyl di(octadecyl)amine
methylethyldodecylamine
methylethyltetradecylamine
methylethyloctadecylamine

Example 12

Following the procedure of the preceding example, the following antistatic agents are prepared

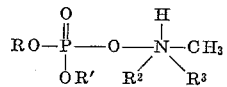

| R | R' | R² | R³ |
|---|---|---|---|
| $CH_3$ | $CH_3$ | $CH_3$ | $C_{12}H_{25}$ |
| $C_2H_5$ | $C_2H_5$ | $CH_3$ | $C_{18}H_{37}$ |
| $C_4H_9$ | $C_4H_9$ | $CH_3$ | $C_{18}H_{37}$ |
| $C_6H_{13}$ | $C_6H_{13}$ | $CH_3$ | $C_{12}H_{25}$ |
| $C_{12}H_{25}$ | $C_{12}H_{25}$ | $CH_3$ | $C_{12}H_{25}$ |
| $C_{18}H_{37}$ | $C_{18}H_{37}$ | $C_2H_5$ | $C_{12}H_{25}$ |
| $C_2H_5$ | $C_4H_9$ | $C_4H_9$ | $C_{12}H_{25}$ |
| $CH_3$ | $C_{12}H_{25}$ | $C_7H_{15}$ | $C_{12}H_{25}$ |
| $CH_3$ | $C_{18}H_{37}$ | $C_2H_5$ | $C_{12}H_{25}$ |
| $C_2H_5$ | $C_{13}H_{27}$ | $C_2H_5$ | $C_{12}H_{25}$ |
| $CH_3$ | $CH_3$ | $C_6H_{13}$ | $C_{12}H_{25}$ |
| $C_2H_5$ | $C_2H_5$ | $CH_3$ | $C_8H_{17}$ | $C_{12}H_{25}$ |
| $C_2H_5$ | $C_2H_5$ | $C_8H_{17}$ | $C_{12}H_{25}$ |
| $C_4H_9$ | $C_4H_9$ | $C_4H_9$ | $C_{12}H_{25}$ |
| $C_{10}H_{23}$ | $C_{10}H_{23}$ | $CH_3$ | $C_{18}H_{37}$ |
| isopropyl | isopropyl | $CH_3$ | $C_{18}H_{37}$ |

Example 13

Compounds of the following formula are prepared and found to be effective antistatic agents at concentrations ranging from 0.01 to 10%.

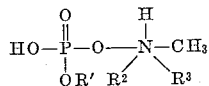

| R' | R² | R³ |
|---|---|---|
| CH₃ | CH₃ | C₁₈H₃₇ |
| C₂H₅ | CH₃ | C₁₄H₂₉ |
| C₄H₉ | CH₃ | C₁₂H₂₅ |
| C₆H₁₃ | CH₃ | C₁₈H₃₇ |
| C₈H₁₇ | CH₃ | C₁₂H₂₅ |
| C₁₁H₂₃ | CH₃ | C₁₈H₃₇ |
| C₁₆H₃₃ | CH₃ | C₁₈H₃₇ |
| C₁₂H₂₅C₆H₄ | CH₃ | C₁₈H₃₇ |
| C₈H₁₇C₆H₄ | C₄H₉ | C₁₂H₂₅ |
| C₄H₉C₆H₄ | C₆H₁₃ | C₁₂H₂₅ |
| C₁₃H₂₇ | CH₃ | C₁₂H₂₅ |
| C₁₃H₂₇ | CH₃ | C₁₄H₂₉ |
| C₁₃H₂₇ | C₂H₅ | C₁₂H₂₅ |

Example 14

The products of Example 13 are further reacted with a second mole of amine to product antistatic agents of the formula

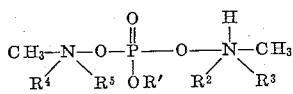

| R' | R² | R³ | R⁴ | R⁵ |
|---|---|---|---|---|
| CH₃ | CH₃ | C₁₈H₃₇ | CH₃ | C₁₈H₃₇ |
| C₂H₅ | CH₃ | C₁₄H₂₉ | CH₃ | C₁₄H₂₉ |
| C₄H₉ | CH₃ | C₁₂H₂₅ | CH₃ | C₁₂H₂₅ |
| C₆H₁₃ | CH₃ | C₁₈H₃₇ | CH₃ | C₁₈H₃₇ |
| C₈H₁₇ | CH₃ | C₁₂H₂₅ | CH₃ | C₁₈H₃₇ |
| C₁₁H₂₃ | CH₃ | C₁₈H₃₇ | CH₃ | C₁₂H₂₅ |
| C₁₆H₃₃ | CH₃ | C₁₈H₃₇ | CH₃ | C₁₈H₃₇ |
| C₁₂H₂₅C₆H₄ | CH₃ | C₁₈H₃₇ | CN₃ | C₁₂H₂₅ |
| C₈H₁₇C₆H₄ | C₄H₉ | C₁₂H₂₅ | CH₃ | C₁₈H₃₇ |
| C₄H₉C₆H₄ | C₆H₁₃ | C₁₂H₂₅ | CH₃ | C₁₂H₂₅ |
| C₁₃H₂₇ | CH₃ | C₁₂H₂₅ | C₄H₉ | C₁₂H₂₅ |
| C₁₃H₂₇ | CH₃ | C₁₄H₂₉ | CH₃ | C₁₈H₃₇ |
| C₁₃H₂₇ | C₂H₅ | C₁₂H₂₅ | C₂H₅ | C₁₂H₂₅ |

What is claimed is:

1. A composition comprising a polymeric resin selected from the group consisting of polyethylene, polypropylene, polystyrene, polyamides, polyesters, polyvinyl chloride, polyvinylidene chloride, acrylates and methacrylates, polyurethanes, phenolics and acrylonitrile-butadiene-styrene copolymers, said polymeric resin having uniformly dispersed therein from about 0.01 to about 10% by weight of a compound of the formula:

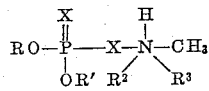

wherein R is selected from the group consisting of hydrogen, alkyl of up to 18 carbon atoms, monoalkylphenyl of from 4 to 12 carbon atoms in the alkyl group, and substituents of the formula:

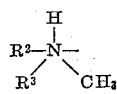

wherein:
R' is selected from the group consisting of alkyl of up to 18 carbon atoms and monoalkylphenyl of from 4 to 12 carbon atoms in the alkyl group,
R² is alkyl of up to 18 carbon atoms,
R³ is alkyl of from 12 to 18 carbon atoms, and
X is selected from the group consisting of oxygen and sulfur.

2. The composition of claim 1 wherein said uniformly dispersed compound is of the formula:

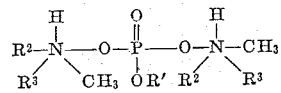

wherein R' and R² are each alkyl of up to 18 carbon atoms and R³ is alkyl of from 12 to 18 carbon atoms.

3. The composition of claim 1 wherein said uniformly dispersed compound is of the formula:

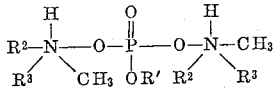

wherein:
R' is monoalkylphenyl of from 4 to 12 carbon atoms in the alkyl group,
R² is alkyl of up to 18 carbon atoms, and
R³ is alkyl of from 12 to 18 carbon atoms.

4. The composition of claim 1 wherein said uniformly dispersed compound is of the formula:

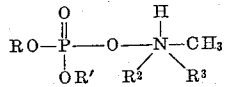

wherein R, R' and R² are each alkyl of up to 18 carbon atoms and R³ is alkyl of from 12 to 18 carbon atoms.

5. The composition of claim 1 wherein said uniformly dispersed compound is of the formula:

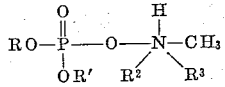

wherein:
R and R' are each monoalkylphenyl of from 4 to 12 carbon atoms in the alkyl group,
R² is alkyl of up to 18 carbon atoms, and
R³ is alkyl of from 12 to 18 carbon atoms.

6. The composition of claim 1 wherein R² is methyl.

7. The composition of claim 1 wherein R³ is octadecyl.

8. The composition of claim 1 wherein said polymeric resin is polyethylene and the amount of said uniformly dispersed compound is from about 0.01 to about 6% by weight.

9. A composition comprising a polymeric resin subject to static charge accumulation having uniformly dispersed therein a compound of the formula:

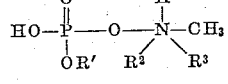

wherein R' and R² are each alkyl of up to 18 carbon atoms and R³ is alkyl from 12 to 18 carbon atoms.

10. A composition comprising a polymeric resin subject to static charge accumulation having uniformly dispersed therein a compound of the formula:

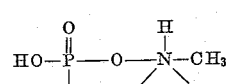

wherein:
R' is monoalkylphenyl of from 4 to 12 carbon atoms in the alkyl group,
R² is alkyl of up to 18 carbon atoms, and
R³ is alkyl of from 12 to 18 carbon atoms.

11. A method for reducing the accumulation of static charges on a polymeric resin selected from the group consisting of polyethylene, polypropylene, polystyrene, polyamides, polyesters, polyvinyl chloride, polyvinylidene chloride, acrylates and methacrylates, polyurethanes, phenolics and acrylonitrile-butadiene-styrene copolymers, said method comprising uniformly dispersing therein from about 0.01 to about 10% by weight of a compound of the formula:

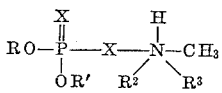

wherein R is selected from the group consisting of hydrogen, alkyl of up to 18 carbon atoms, monoalkylphenyl of from 4 to 12 carbon atoms in the alkyl group, and substituents of the formula:

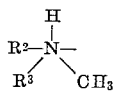

wherein:
R' is selected from the group consisting of alkyl of up to 18 carbon atoms and monoalkylphenyl of from 4 to 12 carbon atoms in the alkyl group,
$R_2$ is alkyl of up to 18 carbon atoms,
$R_3$ is alkyl of from 12 to 18 carbon atoms,
and X is selected from the group consisting of oxygen and sulfur.

12. A method for reducing the accumulation of static charges on a blown polyolefin article which comprises introducing a sufficient quantity of a compound of the formula:

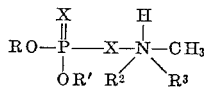

wherein R is selected from the group consisting of hydrogen, alkyl of up to 18 carbon atoms, monoalkylphenyl of from 4 to 12 carbon atoms in the alkyl group, and substituents of the formula:

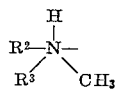

wherein:
R' is selected from the group consisting of alkyl of up to 18 carbon atoms and monoalkylphenyl of from 4 to 12 carbon atoms in the alkyl group,
$R_2$ is alkyl of up to 18 carbon atoms,
$R_3$ is alkyl of from 12 to 18 carbon atoms,
and X is selected from the group consisting of oxygen and sulfur,
into the air supply employed in blowing the article to deposit from about 0.01 to 2% by weight of said compound on the inner surface thereof.

13. The method for enhancing the printability of polyolefin film which comprises incorporating therein from about 0.01 to 2% by weight of a compound of the formula:

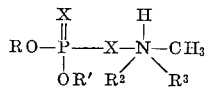

wherein R is selected from the group consisting of hydrogen, alkyl of up to 18 carbon atoms, monoalkylphenyl of from 4 to 12 carbon atoms in the alkyl group, and substituents of the formula:

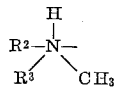

wherein:
R' is selected from the group consisting of alkyl of up to 18 carbon atoms and monoalkylphenyl of from 4 to 12 carbon atoms in the alkyl group,
$R_2$ is alkyl of up to 18 carbon atoms,
$R_3$ is alkyl of from 12 to 18 carbon atoms,
and X is selected from the group consisting of oxygen and sulfur.

14. A composition comprising a polymeric resin subject to static charge accumulation having uniformly dispersed therein from about 0.01 to about 10% by weight of a mixture comprising the monoethyl and diethyl esters of dodecyldimethylammonium phosphate.

15. A composition comprising a polymeric resin subject to static charge accumulation having uniformly dispersed therein from about 0.01 to about 10% by weight of a mixture comprising the monotridecyl and ditridecyl esters of octadecyldimethylammonium phosphate.

16. A method for reducing the accumulation of static charges on a polymeric resin which comprises combining therewith from about 0.01 to about 10% by weight of a mixture comprising the monoethyl and diethyl esters of dodecyldimethylammonium phosphate.

17. A method for reducing the accumulation of static charges on a polymeric resin which comprises combining therewith from about 0.01 to about 10% by weight of a mixture comprising the monotridecyl and ditridecyl esters of octadecyldimethylammonium phosphate.

18. A mixture comprising the mono-tridecyl and di-tridecyl esters of octadecyldimethylammonium phosphate.

19. A mixture comprising the monoethyl and diethyl esters of dodecyldimethylammonium phosphate.

References Cited
UNITED STATES PATENTS

| | | | |
|---|---|---|---|
| 2,729,576 | 1/1956 | Trusler | 260—924 |
| 3,136,809 | 6/1964 | Seiler | 260—924 |

JOSEPH L. SCHOFER, *Primary Examiner.*

L. EDELMAN, *Assistant Examiner.*